United States Patent
Soma et al.

(10) Patent No.: US 12,125,195 B2
(45) Date of Patent: Oct. 22, 2024

(54) INSPECTION SYSTEM, INSPECTION METHOD, AND NON-TRANSITORY RECORDING MEDIUM

(71) Applicants: Takashi Soma, Kanagawa (JP); Takuji Kamada, Kanagawa (JP)

(72) Inventors: Takashi Soma, Kanagawa (JP); Takuji Kamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 98 days.

(21) Appl. No.: 18/157,432

(22) Filed: Jan. 20, 2023

(65) Prior Publication Data

US 2023/0281795 A1    Sep. 7, 2023

(30) Foreign Application Priority Data

Mar. 4, 2022 (JP) .................................. 2022-033480
Nov. 30, 2022 (JP) .................................. 2022-191243

(51) Int. Cl.
*G06T 7/00* (2017.01)
*B41J 29/393* (2006.01)
*H04N 23/611* (2023.01)

(52) U.S. Cl.
CPC .............. *G06T 7/001* (2013.01); *B41J 29/393* (2013.01); *H04N 23/611* (2023.01); *G06T 2207/30124* (2013.01); *G06T 2207/30144* (2013.01)

(58) Field of Classification Search
CPC .......... G06T 7/001; G06T 2207/30124; G06T 2207/30144; B41J 29/393; H04N 23/611; H04N 23/661
See application file for complete search history.

(56) References Cited

U.S. PATENT DOCUMENTS

| | | | | |
|---|---|---|---|---|
| 5,940,173 A | * | 8/1999 | Tomii | G01N 21/95 356/445 |
| 10,745,839 B1 | * | 8/2020 | Baker | D05B 35/00 |
| 11,254,154 B1 | * | 2/2022 | Thammasouk | B41J 11/20 |
| 11,668,656 B1 | * | 6/2023 | Myers | G01N 21/8851 356/430 |
| 2009/0217337 A1 | * | 8/2009 | Aastroem | H04N 7/17318 386/326 |
| 2012/0121139 A1 | | 5/2012 | Kojima et al. | |

(Continued)

FOREIGN PATENT DOCUMENTS

| | | |
|---|---|---|
| JP | 2002-199267 | 7/2002 |
| JP | 2006-334096 | 12/2006 |

(Continued)

*Primary Examiner* — Timothy R Newlin
(74) *Attorney, Agent, or Firm* — Harness, Dickey & Pierce, P.L.C.

(57) ABSTRACT

An inspection system, an inspection method, and non-transitory recording medium. The inspection system acquires an image, captured by an image sensor, of the object to be inspected placed on a placement surface, the object having a printed image printed thereon, displays by a projector, print image data of the print image and attribute information of the object to be inspected, on the placement surface, compares a captured image of the object to be inspected with the print image data to determine whether there is a defect, and based on a determination that there is a defect, output defect information for specifying the defect.

10 Claims, 16 Drawing Sheets

(56) References Cited

U.S. PATENT DOCUMENTS

| | | | |
|---|---|---|---|
| 2012/0194874 A1* | 8/2012 | Milanski | G06V 10/993 358/448 |
| 2013/0251238 A1* | 9/2013 | Han | G06T 7/337 382/151 |
| 2015/0153841 A1* | 6/2015 | Fang | G06F 3/0386 348/164 |
| 2015/0206217 A1* | 7/2015 | Cohen | G06Q 30/00 705/26.5 |
| 2017/0256047 A1* | 9/2017 | Schumann | G06T 7/0004 |
| 2017/0270655 A1 | 9/2017 | Watanabe et al. | |
| 2017/0322021 A1* | 11/2017 | Takagi | G06V 10/24 |
| 2018/0106593 A1* | 4/2018 | Arden | G01B 11/2513 |
| 2018/0211373 A1* | 7/2018 | Stoppa | G06T 7/55 |
| 2018/0259394 A1 | 9/2018 | Gotoh et al. | |
| 2018/0350059 A1 | 12/2018 | Watanabe et al. | |
| 2019/0248129 A1 | 8/2019 | Drees et al. | |
| 2020/0009860 A1 | 1/2020 | Kamada | |
| 2020/0018650 A1 | 1/2020 | Sone et al. | |
| 2020/0027147 A1* | 1/2020 | Dahlstrom | G06Q 20/18 |
| 2021/0033463 A1* | 2/2021 | Ichioka | B41J 2/16585 |
| 2021/0056679 A1 | 2/2021 | Nakashige et al. | |
| 2021/0172105 A1* | 6/2021 | Baker | B65H 7/14 |
| 2021/0209740 A1 | 7/2021 | Kamada et al. | |
| 2021/0270755 A1* | 9/2021 | De Beenhouwer | G06T 7/001 |
| 2021/0366101 A1* | 11/2021 | George Boehm, Jr. | G06T 7/0004 |
| 2022/0100433 A1 | 3/2022 | Tanaka et al. | |
| 2023/0075297 A1* | 3/2023 | Brauer | G06T 7/70 |
| 2023/0196548 A1* | 6/2023 | Ikeda | G06V 10/758 382/149 |
| 2023/0217087 A1* | 7/2023 | Chan | H04N 23/11 348/243 |
| 2023/0333026 A1* | 10/2023 | Mastrotto | C14B 17/005 |

FOREIGN PATENT DOCUMENTS

| | | |
|---|---|---|
| JP | 2008-014701 | 1/2008 |
| JP | 2008-170254 | 7/2008 |
| JP | 2012-103225 | 5/2012 |
| JP | 2014-136037 | 7/2014 |
| JP | 2016-150155 | 8/2016 |
| JP | 2018-054435 | 4/2018 |

* cited by examiner

FIG. 7

| IDENTIFICATION INFORMATION | ATTRIBUTE INFORMATION | PRINT IMAGE DATA |
|---|---|---|
| CODE 1 | TYPE: SHORT-SLEEVED<br>COLOR: WHITE<br>SIZE: M<br>... | PRINT IMAGE    TARGET IMAGE |
| CODE 2 | TYPE: LONG-SLEEVED<br>COLOR: BLACK<br>SIZE: S<br>... | ... |
| ... | ... | ... |

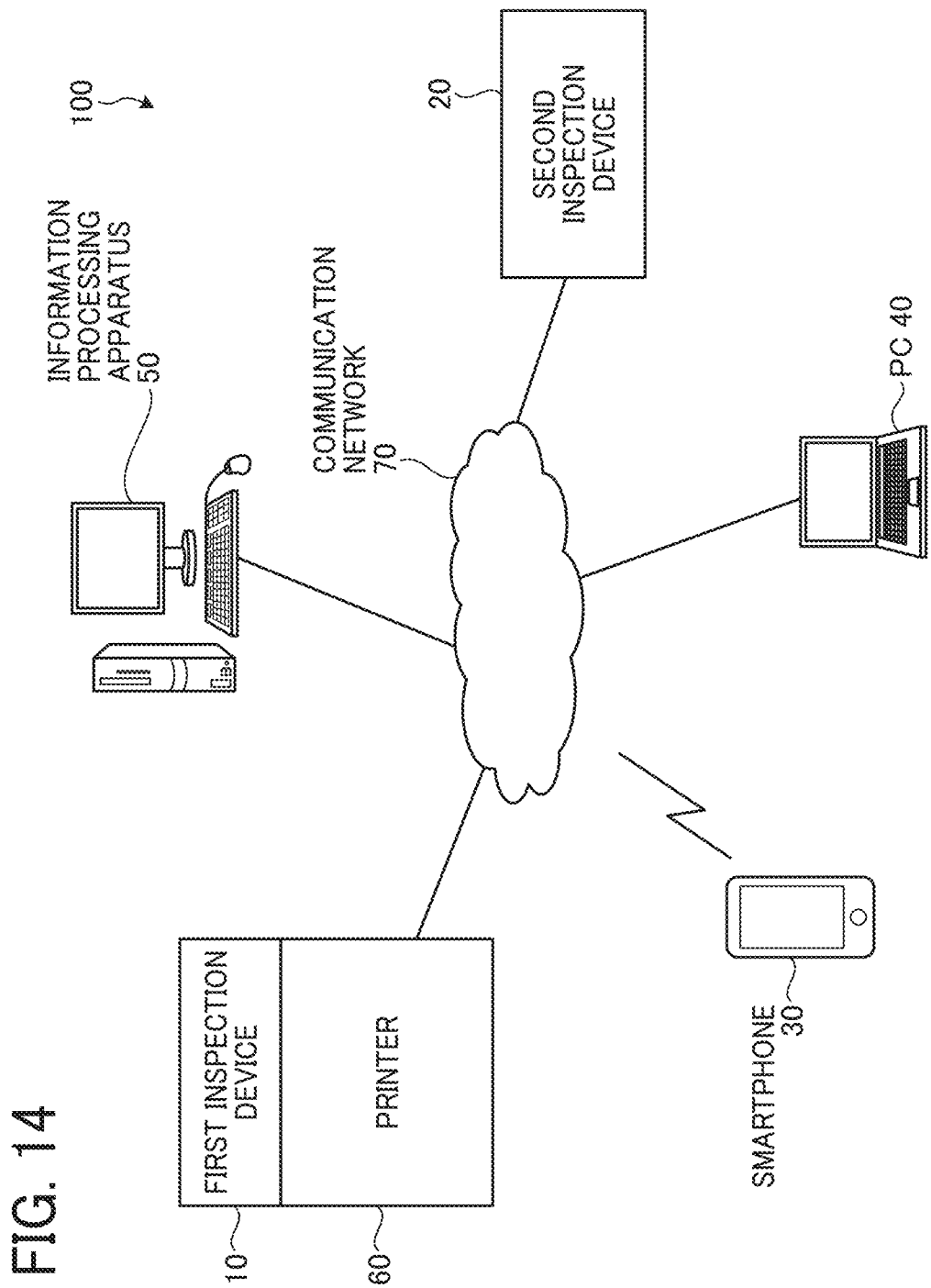

INSPECTION SYSTEM, INSPECTION METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-033480, filed on Mar. 4, 2022, and Japanese Patent Application No. 2022-191243, filed on Nov. 30, 2022, in the Japan Patent Office, the entire disclosure of which is hereby incorporated by reference herein.

BACKGROUND

Technical Field

The present disclosure relates to an inspection system, an inspection method, and a non-transitory recording medium.

Background Art

In a conventional method of printing a desired design on a shirt fabric or the like, an operator visually inspects the finished product on which the design is printed, to check for misalignment of the printed design or correctness of an image of the design.

For the purpose of embroidering at a predetermined position on the shirt or printing a predetermined motif on the shirt, techniques have been disclosed for aligning shirts on a bordered platform.

SUMMARY

Embodiments of the present disclosure describe an inspection system, an inspection method, and non-transitory recording medium. The inspection system acquires an image, captured by an image sensor, of the object to be inspected placed on a placement surface, the object having a printed image printed thereon, displays by a projector, print image data of the print image and attribute information of the object to be inspected, on the placement surface, compares a captured image of the object to be inspected with the print image data to determine whether there is a defect, and based on a determination that there is a defect, output defect information for specifying the defect.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7 is a diagram illustrating an example of a table in which identification information is associated with attribute information and print image data;

FIG. 14 is a schematic diagram illustrating a modified configuration of the inspection system according to embodiments of the present disclosure.

Figure 1:
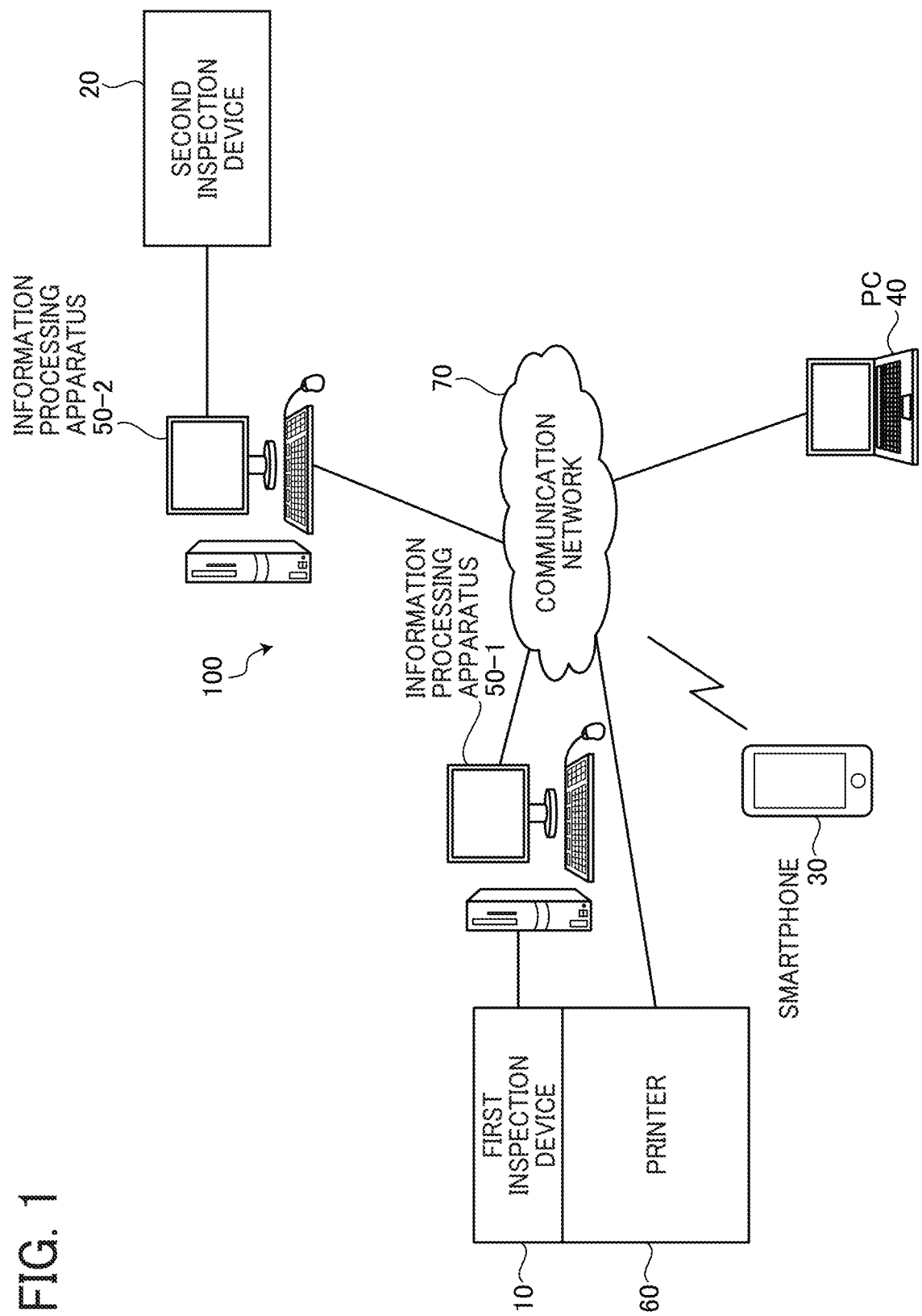
FIG. 1 is a schematic diagram illustrating a configuration of an inspection system according to embodiments of the preset disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of an inspection system, an information processing apparatus, an inspection method, and a non-transitory recording medium are described in detail with reference to the drawings.

FIG. 1 is a schematic diagram illustrating a configuration of the inspection system 100 according to embodiments of the present disclosure. The inspection system 100 is a system for inspecting print quality after printing a custom T-shirt (object to be inspected). As illustrated in FIG. 1, the inspection system 100 includes a first inspection device 10 and a second inspection device 20. The inspection system 100 also includes an information processing apparatus 50-1, which is a server, or a personal computer (PC) connected to the first inspection device 10, and an information processing apparatus 50-2, which is another server or PC connected to the second inspection device 20, a smartphone 30, a PC 40, and a printer 60 communicatively connected through a communication network 70.

Information processing apparatus 50-1, information processing apparatus 50-2, smartphone 30, PC 40, and printer 60 are connected to a network, but may not be installed in the same place. For example, the information processing apparatuses 50-1 and 50-2 may be placed overseas. Further, the information processing apparatuses 50-1 and 50-2 may be configured to perform processing by distributing functions to a plurality of servers. In the following description, the information processing apparatuses 50-1 and 50-2 are referred to as the information processing apparatus 50 when not distinguishing between the information processing apparatuses 50-1 and 50-2.

The smartphone 30 and PC 40 are used by a custom T-shirt customer. The smartphone 30 and the PC 40 are used to order a T-shirt in which the custom T-shirt customer designates T-shirt information (color, size, etc.) and a desired design.

The information processing apparatus 50 is managed, for example, at a factory of a custom T-shirt printing company. The information processing apparatus 50 receives T-shirt information (color, size, etc.) and design information from the customer who placed an order from the smartphone 30 or the PC 40.

The operator of the factory confirms the information (color, size, etc.) and the design of the T-shirt on the information processing apparatus 50, sets a predetermined T-shirt on the printer 60, and prints the designated design. After printing, the operator of the factory performs a quality inspection to detect a defect in the print. In the present embodiment, the quality inspection is performed in two stages. A first inspection immediately after printing is performed using the first inspection device 10. A second inspection after drying is completed after printing is performed using the second inspection device 20.

The first inspection device 10 is provided close to the printer 60. The first inspection device 10 is an inspection device that automatically inspects for the defect based on the difference between a target image and a captured image of a printed surface immediately after printing by the printer 60.

Figure 2A:
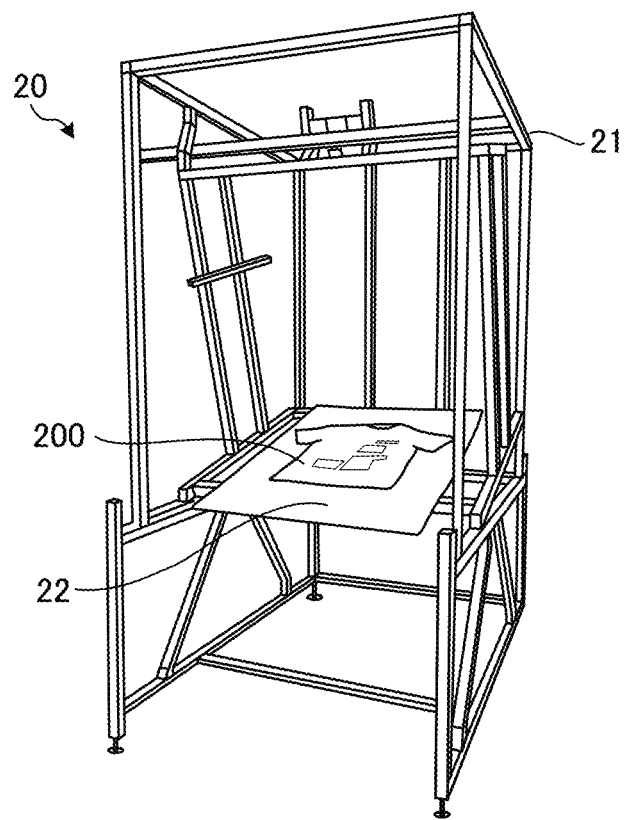
FIG. 2A is a diagram illustrating a perspective view of a second inspection device.
Figure 2B:
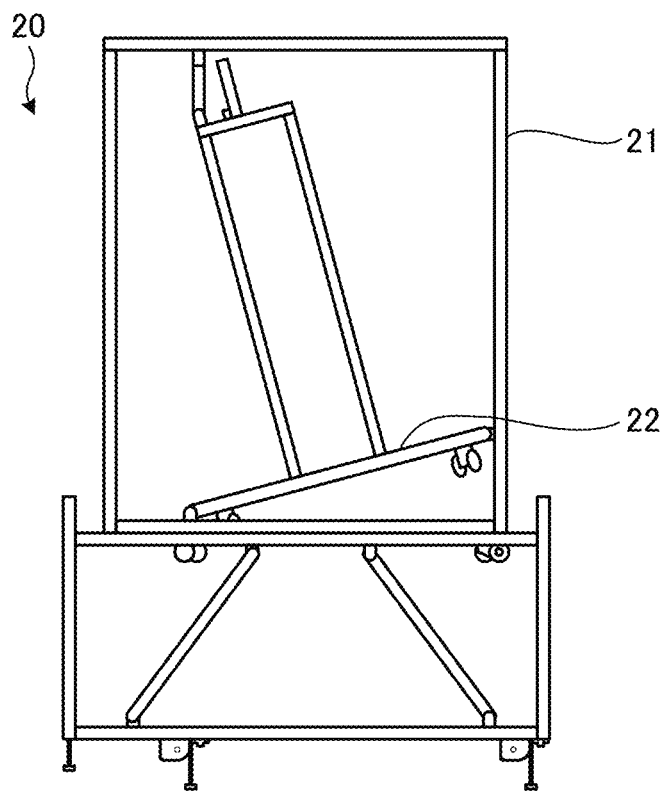
FIG. 2B is a diagram illustrating a side view of the second inspection device.
Figure 2C:
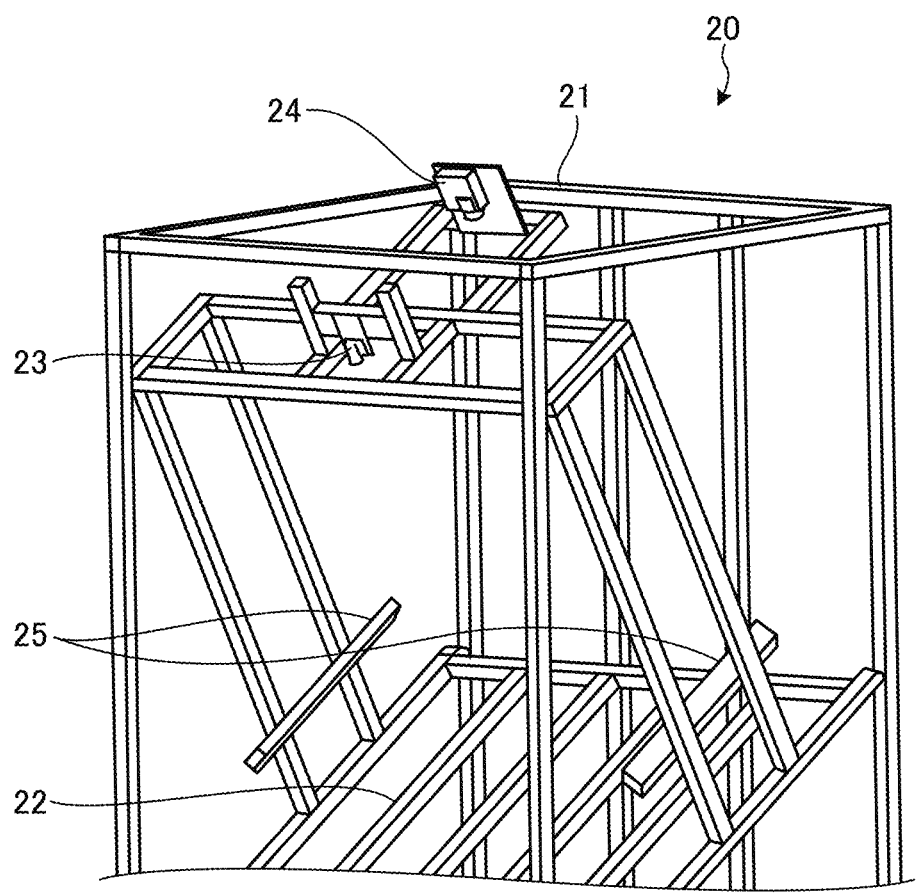
FIG. 2C is a diagram illustrating a perspective view of an enlarged part of the second inspection device.
Figure 2D:
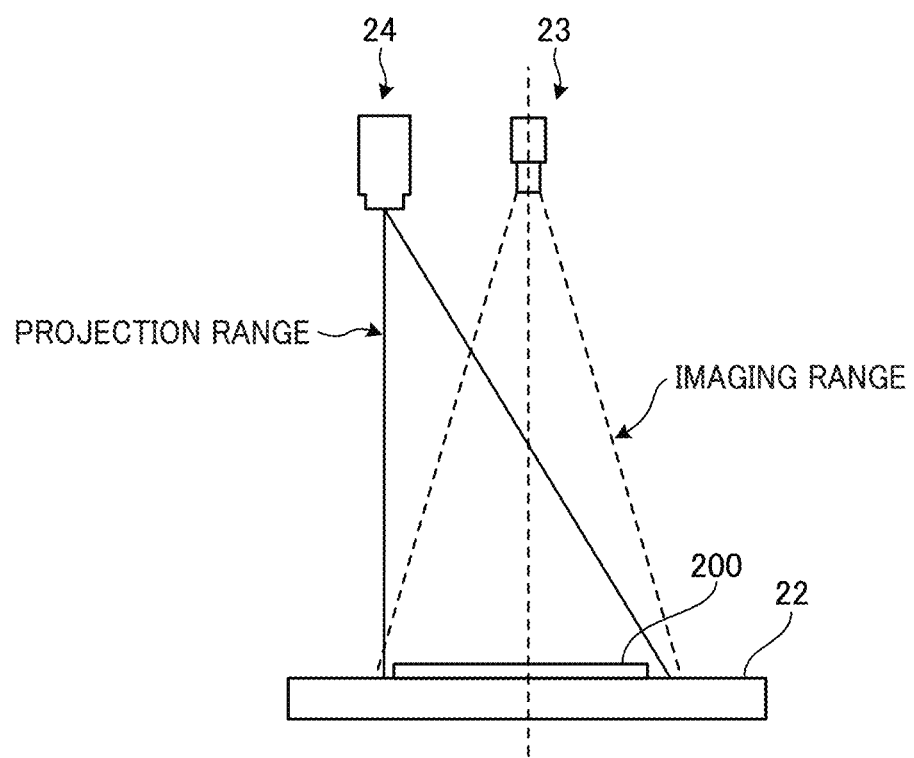
FIG. 2D is a diagram illustrating a positional relationship between an image sensor and a projector of the second inspection device.

The second inspection device 20 is an inspection device that automatically inspects print misalignment after printing and drying are completed, based on the difference between the target image and the image of the printed surface of the T-shirt placed on a placement table 22 (see FIGS. 2A to 2D) captured by an image sensor 23 (see FIGS. 2C and 2D). In addition, the second inspection device 20 inspects inconsistency with the print job information (customer, size, destination, etc.).

A configuration of the second inspection device 20 is described in the following.

FIG. 2A is a diagram illustrating a perspective view of the second inspection device 20, FIG. 2B is a diagram illustrating a side view of the second inspection device 20, FIG. 2C is a diagram illustrating a perspective view of an enlarged part of the second inspection device 20, and FIG. 2D is a diagram illustrating a positional relationship between an image sensor 23 and a projector 24 of the second inspection device 20. As illustrated in FIGS. 2A to 2C, the second inspection device 20 includes a main body 21 configured by a rectangular parallelepiped metal frame. The second inspection device 20 includes the placement table 22 including a placement surface on which the T-shirt 200 that has been dried after printing is placed, substantially in the center of the main body 21. The placement table 22 is installed with an inclination toward the operator to facilitate the operator operate the placement table by viewing.

The placement table 22 includes a marker M (see FIG. 10) for indicating to the operator a correct placing position of the T-shirt 200 on the placement table 22.

Note that the placement table 22 is not limited to the placement table including a table-like placing surface. For example, the placement table 22 may have a placing surface in which the T-shirt 200 that is dried after printing is hung.

The second inspection device 20 includes on top of the main body 21, an image sensor 23 for capturing an image of the T-shirt placed on the placement table 22, a projector 24, which is a projector for presenting operation information and the like to the operator, and an illuminator 25. The image sensor 23 and the projector 24 are installed such that an imaging plane of the image sensor 23 and a projection plane of the projector 24 are perpendicular to the placement table 22. Note that the image sensor 23 and the projector 24 are connected to the information processing apparatus 50 in the factory through the communication network 70. As illustrated in FIG. 2D, the positional relationship between the image sensor 23 and the projector 24 is such that the projection range of the projector 24 is within the imaging range of the image sensor 23.

Electrical connection of the second inspection device 20 is described in the following.

Figure 3:
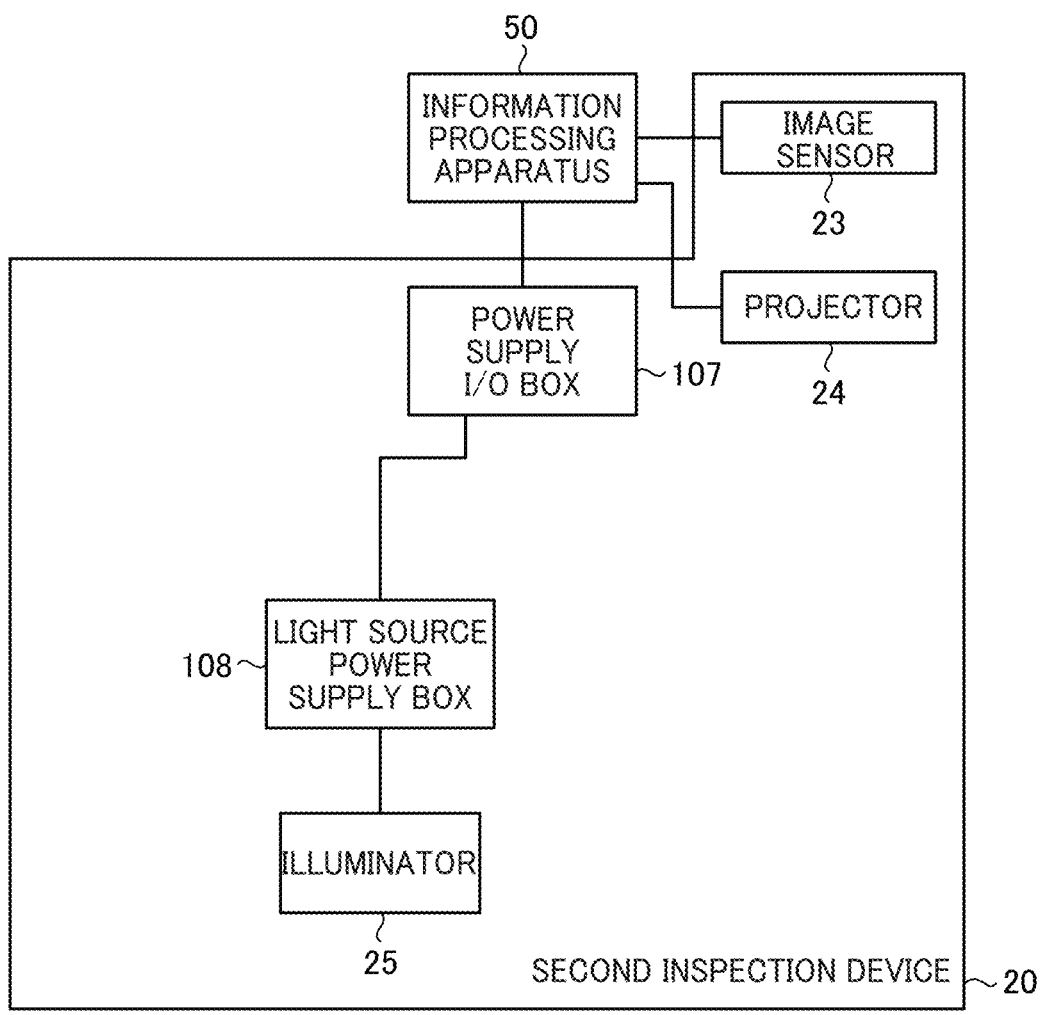
FIG. 3 is a block diagram illustrating electrical connection of the second inspection device.

FIG. 3 is a block diagram illustrating the electrical connection of the second inspection device 20. As illustrated in FIG. 3, the second inspection device 20 includes a power supply input/output (I/O) box 107 and a light source power supply box 108. The information processing apparatus 50 is connected to the second inspection device 20 through the power supply I/O box 107.

The illuminator 25 is connected to the information processing apparatus 50 through the power supply I/O box 107 and the light source power supply box 108. The information processing apparatus 50 controls lighting of the illuminator 25.

The image sensor 23 and the projector 24 are directly connected to and controlled by the information processing apparatus 50.

The image sensor 23 is, for example, a digital camera implemented by a complementary metal oxide semiconductor (CMOS), and outputs a signal corresponding to projected light. Note that the image sensor 23 may be a digital camera implemented by a charge coupled device (CCD).

A hardware configuration of the information processing apparatus 50 is described in the following.

Figure 4:
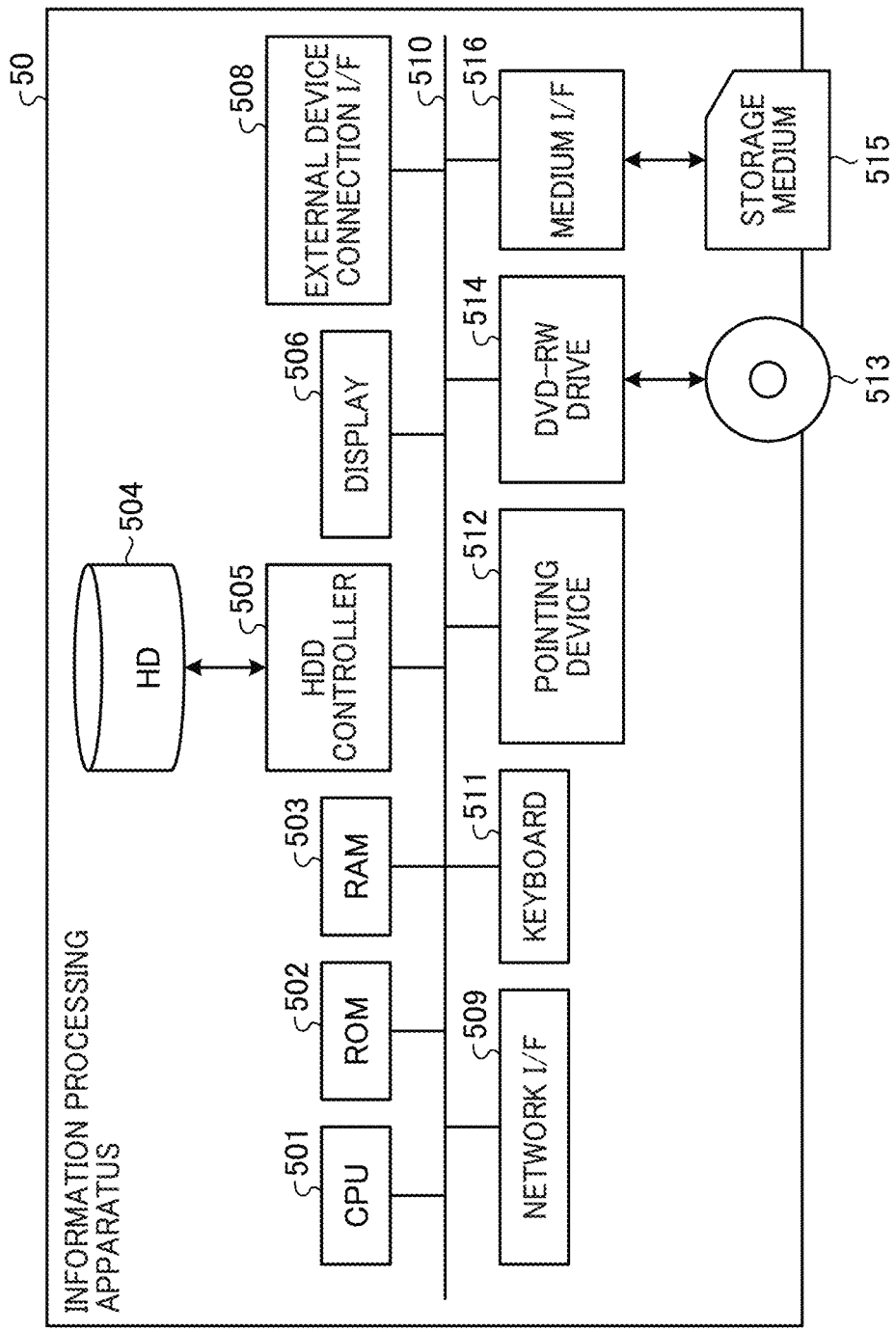
FIG. 4 is a block diagram illustrating an example of a hardware configuration of an information processing apparatus, according to embodiments of the present disclosure.

FIG. 4 is a block diagram illustrating the hardware configuration of the information processing apparatus 50.

As illustrated in FIG. 4, the information processing apparatus 50 is implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a Digital Versatile Disc-Rewritable (DVD-RW) drive 514, and a medium I/F 516.

The CPU 501 controls overall operation of the information processing apparatus 50. The ROM 502 stores a control program such as an initial program loader (IPL) to boot the CPU 501. The RAM 503 is used as a work area for the CPU 501. The HD 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. Examples of the external devices include, but are not limited to, a universal serial bus (USB) memory and a printer. The network I/F 509 is an interface that controls communication of data with the external device through the communication network 70. The bus line 510 is the address bus, the data bus, or the like for electrically connecting each component such as the CPU 501 illustrated in FIG. 4.

The keyboard 511 is an example of an input device provided with a plurality of keys for allowing a user to input characters, numerals, or various instructions. The pointing device 512 is an example of the input device that allows the user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a Digital Versatile Disc-Recordable (DVD-R) or the like. The medium I/F 516 controls reading and writing (storing) of data from and to a storage medium 515 such as a flash memory.

A program to be executed by the information processing apparatus 50 according to the present embodiment is recorded as a file of an installable format or an executable format on a non-transitory computer-readable recording medium such as a Compact Disc Read-Only Memory (CR-ROM), a flexible disk (FD), a Compact Disc Recordable (CD-R), or a Digital Versatile Disc (DVD).

In another example, the program to be executed by the information processing apparatus 50 according to the present embodiment is stored on a computer connected to a network such as the internet and is provided by being downloaded through the network. In still another example, the program to be executed by the information processing apparatus 50 according to the present embodiment is provided or distributed through the network such as the internet.

A description is now given of characteristic operation of the present embodiment, among various arithmetic processes performed by the CPU 501 of the information processing apparatus 50 by executing the program.

Figure 5:
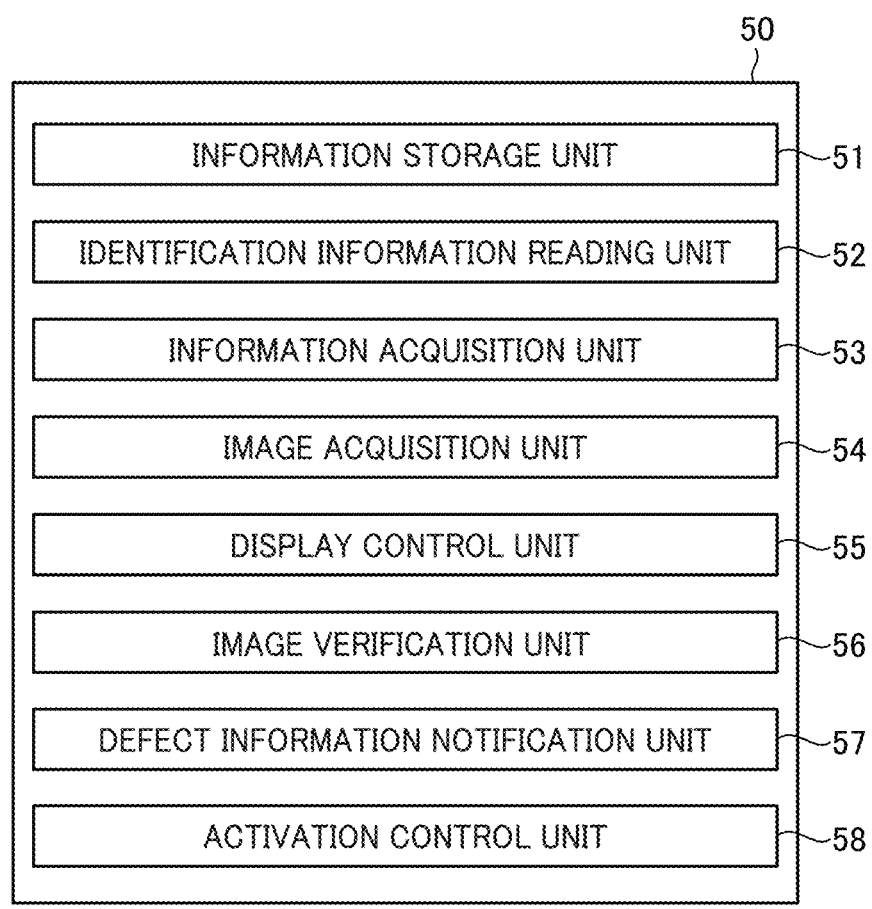
FIG. 5 is a block diagram illustrating an example of a functional configuration of the information processing apparatus according to embodiments of the present disclosure.

FIG. 5 is a block diagram illustrating an example of a functional configuration of the information processing apparatus 50. As illustrated in FIG. 5, the CPU 501 of the information processing apparatus 50 executes a program to control an information storage unit 51, an identification information reading unit 52, an information acquisition unit 53, an image acquisition unit 54, a display control unit 55, an image verification unit 56, a defect information notification unit 57, and an activation control unit 58.

The information storage unit 51 stores print image data and attribute information of the custom T-shirt (object to be inspected) in association with the identification information attached in advance to the custom T-shirt. FIG. 7 is a diagram illustrating an example of a table in which the identification information is associated with the attribute information and the print image data. As illustrated in FIG. 7, the print image data is image data of the design to be printed on the T-shirt designated by the customer (print image), and image data (target image) of a predicted image obtained by predicting the print result when the image data of the print image is printed on the T-shirt. The attribute information is, for example, information associated with the T-shirt, such as a type of T-shirt, a color of fabric, a size, the customer, and a destination.

The target image is described in the following. The print image printed on the T-shirt has different colors after printing, depending on the fabric color such as a white T-shirt or a black T-shirt. The target image is image data of a predicted image generated by predicting what kind of image should ideally appear, when the print image is printed on the fabric color of the T-shirt to be printed.

The target image is used for verifying the printed image using the captured image of the printed T-shirt in the quality inspection of the T-shirts printed with the print image data. The target image is prepared in advance and stored as the print image data since the print image and the information of the T-shirt to be printed are known when a request from the customer is received, but the printed image may be called up and a prediction process may be performed to generate the target image at the time of quality inspection.

The identification information reading unit 52 reads the identification information attached to the custom T-shirt (object to be inspected).

Based on the identification information, the information acquisition unit 53 acquires the attribute information associated with the identification information and the print image data associated with the identification information from the information storage unit 51.

The image acquisition unit 54 acquires the image captured by the image sensor 23 of the custom T-shirt (object to be inspected) placed on the placement surface of the placement table 22.

The display control unit 55 controls the projector 24 to display the print image data and the attribute information regarding the print image acquired by the information acquisition unit 53, on the placement surface of the placement table 22 on which the custom T-shirt (object to be inspected) is placed.

The image verification unit 56 compares the captured image of the custom T-shirt (inspected object) acquired by the image acquisition unit 54 with the target image, which is a part of the print image data.

In the case the target image to be compared is stored in advance in the information storage unit 51 of the information processing apparatus 50 as described above, the stored target image may be acquired and compared, or in the case the target image is not stored in advance, the print image data stored in the information storage unit 51 may be acquired and the prediction process may be performed to generate the target image at the time of comparison.

The defect information notification unit 57 notifies the defect information for specifying the defect when the image verification unit 56 determines that there is a defect as a result of image verification.

The activation control unit 58 activates the image sensor 23, the projector 24 and the illuminator 25 installed in the second inspection device 20. Also, the activation control unit 58 connects the image sensor 23 and the projector 24 to the communication network 70.

A description is now given of characteristic operation among operations performed by the information processing apparatus 50 according to the present embodiment.

Figure 6:
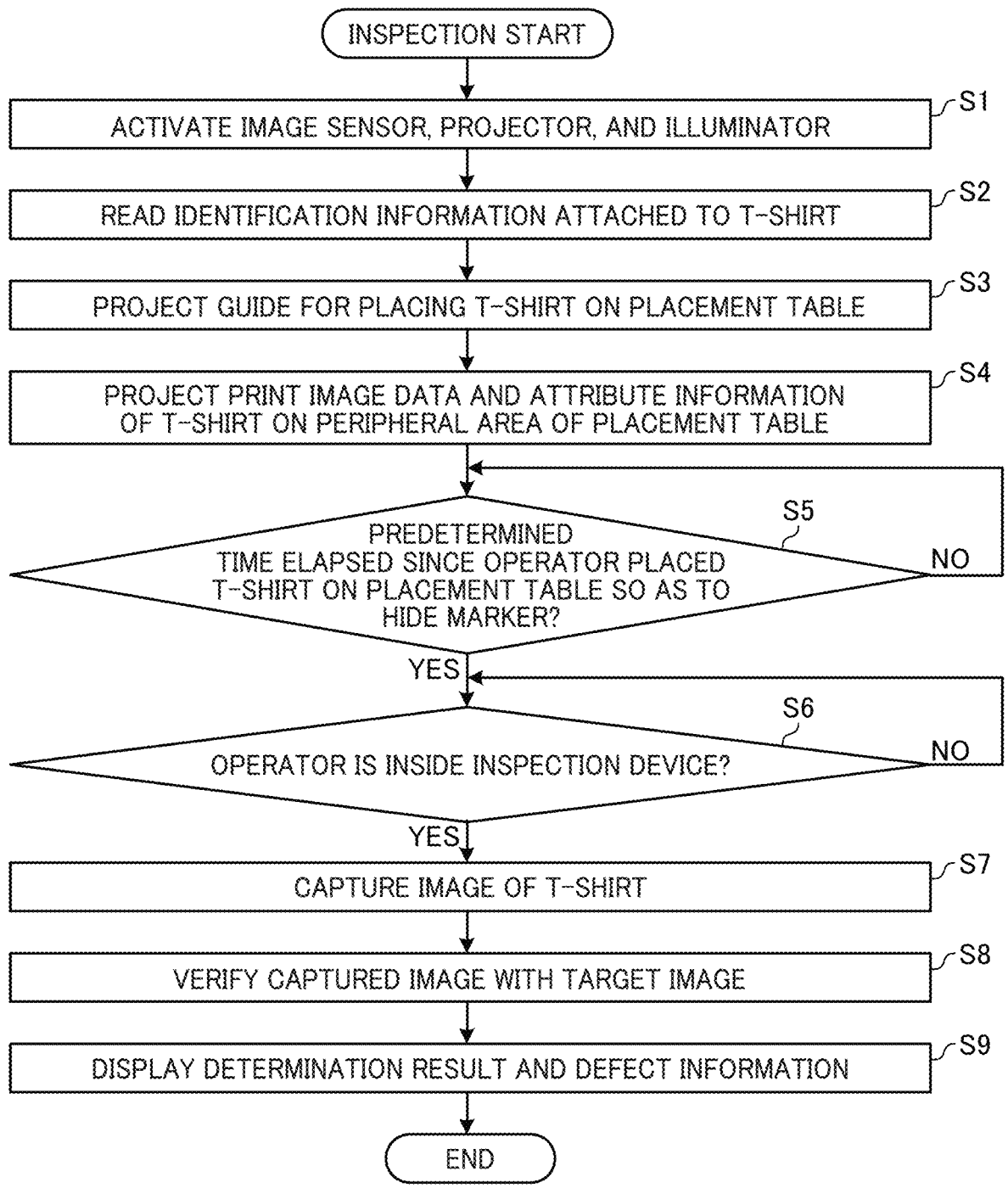
FIG. 6 is a flowchart illustrating an inspection process using the second inspection device.

FIG. 6 is a flowchart illustrating the inspection process using the second inspection device 20.

As illustrated in FIG. 6, in step S1, the activation control unit 58 of the information processing apparatus 50 activates the image sensor 23, the projector 24, and the illuminator 25 installed in the second inspection device 20. Also, the activation control unit 58 of the information processing apparatus 50 connects the image sensor 23 and the projector 24 to the communication network 70. The connection to the communication network allows the operator to issue operation instructions to the second inspection device 20 through the information processing apparatus 50.

In step S2, the identification information reading unit 52 of the information processing apparatus 50 controls the image sensor 23 to read the identification information attached to the T-shirt, and the information acquisition unit 53 acquires the attribute information and the like. The identification information is, for example, code symbol information such as a bar code or two-dimensional code attached to the T-shirt, and is generally used in clothing management in apparel industry. Further, the identification information is not limited to the bar code or two-dimensional code, and may be a list of numbers (numeric characters) as long as the management of T-shirt is possible. The code symbol, for example, may be printed on a T-shirt tag, or may be attached as a code symbol sticker. The identification image is captured by the image sensor 23 of the second inspection device 20.

In the present embodiment, the identification image is captured by the image sensor 23 installed in the second inspection device 20, but the present disclosure is not limited to this configuration, and a separate code symbol scanner may be provided for the operator to read the identification image (code symbol).

The read identification information is transmitted to the information processing apparatus 50. The information storage unit 51 of the information processing apparatus 50 associates the identification information with the attribute information such as the size, color, and design for printing (original target image or reduced image) of the T-shirt, and stores the information in the HD 504 or the like. The information acquisition unit 53 acquires the print image data and attribute information regarding the corresponding print image from the storage unit based on the identification information.

Also, the identification information is not limited to the bar code, and may be stored using an integrated circuit (IC) tag or the like. In this case, an IC tag reader may be provided separately. In the case of using an IC tag or the like in this way, the identification information and the attribute information may be directly stored in the IC tag, provided that the storage capacity is sufficient. Further, for example, the data of the custom T-shirts (objects to be inspected) is input to the information processing apparatus 50 in sequence, provided that the inspection order of the custom T-shirts (objects to be inspected) is known in advance. The identification information of the custom T-shirt (object to be inspected) is acquired without attaching the identification information to the object. As described above, attaching of the identification information to the custom T-shirt (object to be inspected) may be skipped.

In step S3, the display control unit 55 of the information processing apparatus 50 controls the projector 24 to project a guide frame G for placing the T-shirt on the placement table 22. The projected guide frame G is an example of various guide displays to facilitate the inspection operation by the operator.

Figure 8:
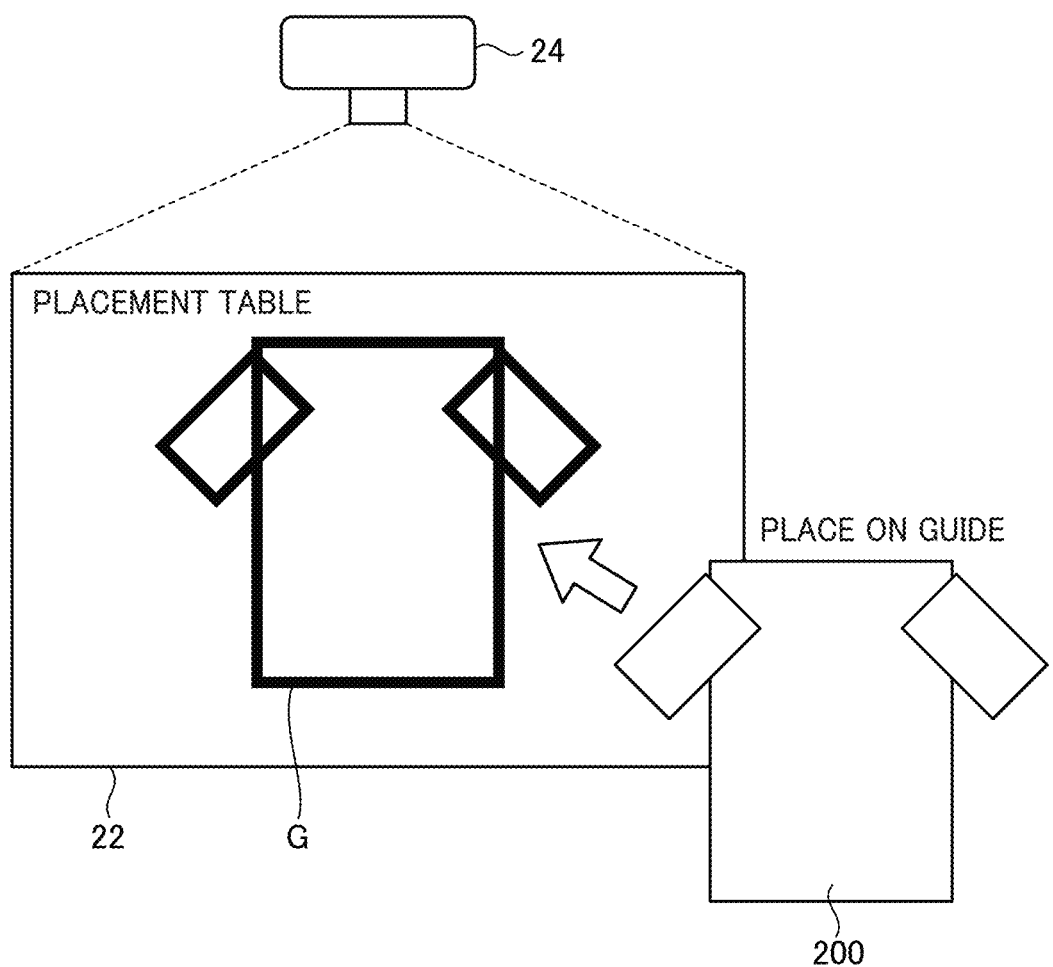
FIG. 8 is a diagram illustrating an example of a projected guide frame.

FIG. 8 is a diagram illustrating an example of the projected guide frame G. As illustrated in FIG. 8, the guide frame G projected on the placement table 22 is a guide for the operator to place the T-shirt 200 at the correct position on the placement table 22 of the second inspection device 2. The guide frame G is an example, and any frame that allows the operator to recognize that the T-shirt 200 is placed in the correct position may be used.

Finding the correct position to place T-shirt is troublesome and may take time to place the T-shirt resulting in unstable inspection speed and accuracy. On the other hand, in the present embodiment, the guide frame G for placing the T-shirt is projected by the projector 24, which stabilizes the imaging (inspection) position and as a result, quick and stable inspection becomes possible.

In step S4, the display control unit 55 of the information processing apparatus 50 controls the projector 24 to project the print image data and the attribute information of the T-shirt on a peripheral portion of the placement table 22. Specifically, the display control unit 55 of the information processing apparatus 50 displays the print image data and attribute information associated with the identification information read in step S2 on the peripheral portion of the placement table 22.

Figure 9:
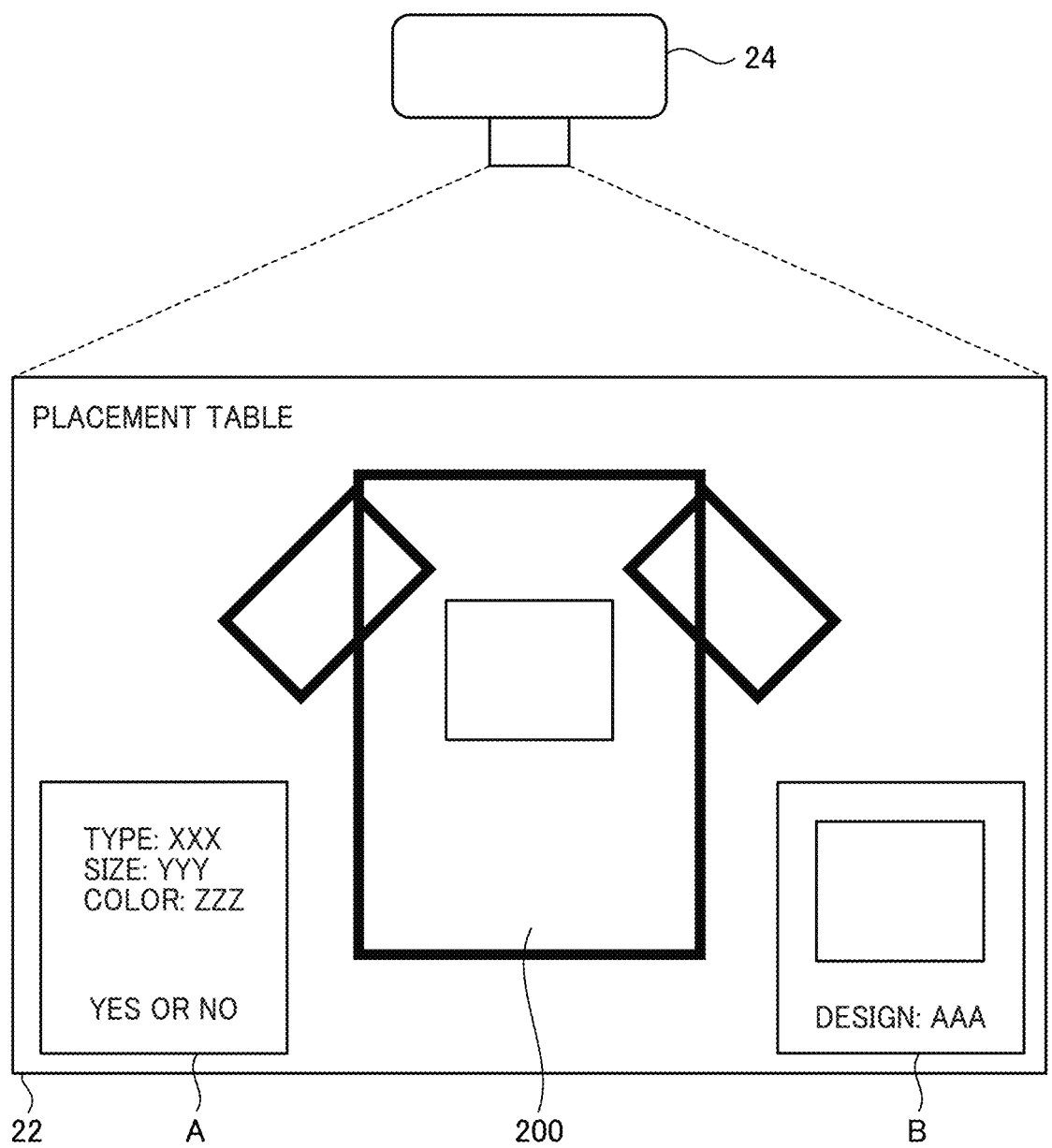
FIG. 9 is a diagram illustrating an example of a projected attribute information.

FIG. 9 is a diagram illustrating an example of projected attribute information. In the example illustrated in FIG. 9, attribute information A including the type, size, and color of the T-shirt 200 is displayed at the lower left of the placement table 22. In the case the captured image at this stage is different from the target image to be printed, NO is displayed. In the example illustrated in FIG. 9, the print image data B (which may be a reduced image based on the T-shirt 200 of the requested content and the design) is displayed at the lower right of the placement table 22. As described above, displaying all the information in the placement table 22 is preferable for the operator to see and confirm the attribute information A. By displaying all information, inspection efficiency is improved and overlooking of item is prevented.

The print image data displayed on the lower right of the placement table 22 may be either the print image or the target image. Although the print image and the target image have different colors as described above, the purpose of displaying the print image data is to enable the operator to correctly place the next T-shirt to be inspected.

A problem that the T-shirt 200 to be inspected may be incorrectly placed and the inspection may not be performed correctly existed conventionally. In the present embodiment, by projecting and displaying with the projector 24, the information to be used for the inspection of the attribute information (size, color, design, etc.) of the inspection object on the left and right sides of the placement table 22 on which the T-shirt 200 is placed, the operator can determine whether the size and color of the T-shirt 200 are different from designation by the customer, and whether an incorrect design has been printed. Since the installation error by the operator can be prevented, inspection efficiency is improved. In addition, cost (disposal, re-inspection) of failure in the inspection due to the operator's setting error of the inspection object, is reduced.

In step S5, the image acquisition unit 54 of the information processing apparatus 50 determines whether a predetermined time has elapsed since the operator placed the T-shirt 200 on the placement table 22 so as to hide the marker M, and in step S6, determines whether the operator is inside the second inspection device 2.

Figure 10:
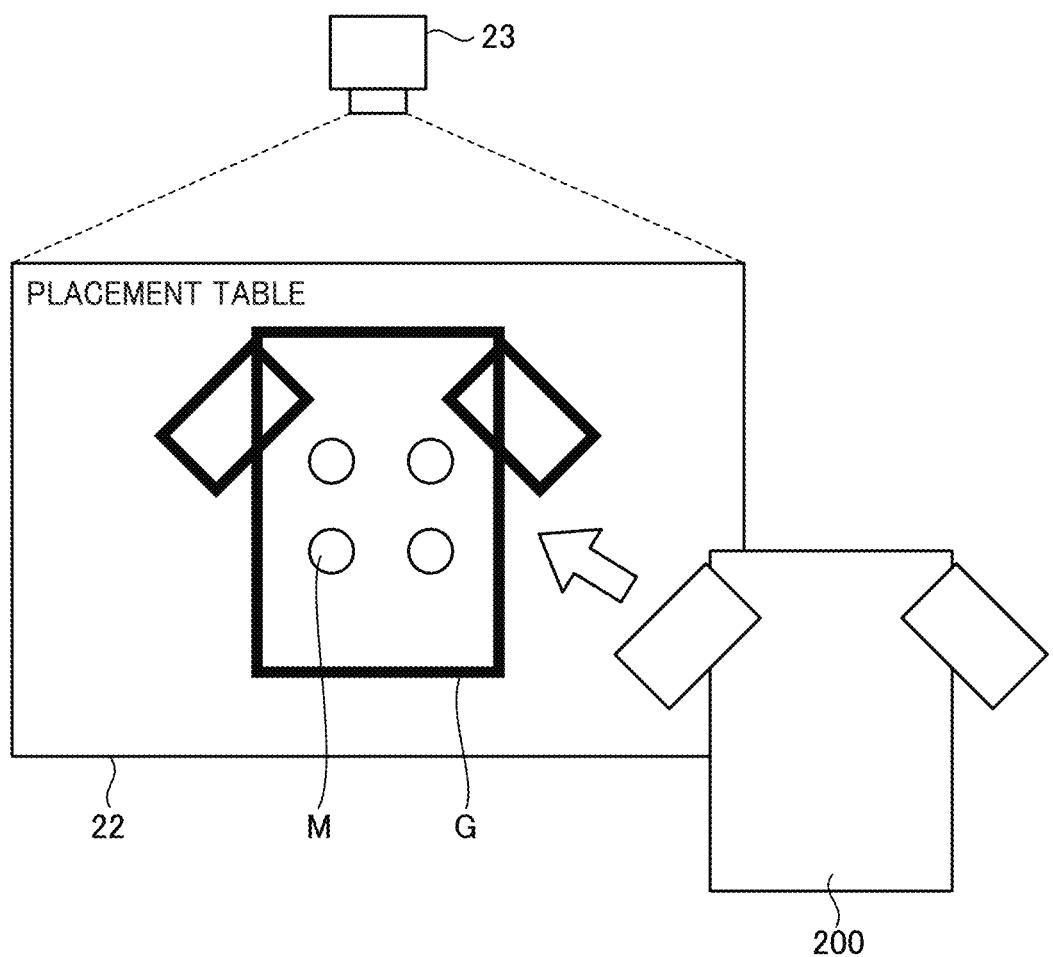
FIG. 10 is a diagram illustrating an example of a state in which a T-shirt is placed on a placement table.

FIG. 10 is a diagram illustrating an example of a state in which the T-shirt is placed on the placement table 22. As illustrated in FIG. 10, the image acquisition unit 54 of the information processing apparatus 50 captures an image or moving image of the marker M with the image sensor 23 at predetermined intervals. The image acquisition unit 54 of the information processing apparatus 50 analyzes the captured or video-captured image and determines whether the predetermined time (for example, 30 seconds) has elapsed.

In the case the predetermined time has not elapsed since the marker M is hidden (No in step S5), the image acquisition unit 54 of the information processing apparatus 50 determines that the operator is placing the T-shirt 200. On the other hand, in the case the predetermined time has elapsed (Yes in step S5), the image acquisition unit 54 of the information processing apparatus 50 determines that the operator has finished setting the T-shirt 200 on the placement table 22.

Based on a determination that the T-shirt is set on the placement table 22 in step S5 (Yes in step S5), the image acquisition unit 54 of the information processing apparatus 50 confirms whether the operator appears in the image by capturing image or video at predetermined time intervals with the image sensor 23 in step S6, since there is a possibility that the operator is inside the second inspection device 2, and the operator may appear in the image when the image of the T-shirt is captured. The information processing apparatus 50 performs image and video analysis and determines that no person is captured.

In the case of manually capturing the image of the T-shirt, the operator may forget to capture the image, and the inspection is skipped. On the other hand, according to the present embodiment, the marker M is provided on the placement table 22 and the image is constantly captured by the image sensor 23 to determine the presence or absence of the marker M on the image. By performing automatic capturing of the image after the T-shirt is placed on the placement table, a risk of forgetting to capture the image for inspection is prevented.

In addition, in the case of the operator manually capturing the image each time the T-shirt is inspected, workload of the operator increases, and capturing errors are likely to occur. According to the present embodiment, since the image of the T-shirt is automatically captured at the predetermined timing, the workload on the operator is reduced. In addition, according to the present embodiment, possibility of the operator interfering the image is eliminated, so that the image of the T-shirt is automatically captured appropriately.

Note that the marker M may be projected from the projector 24 instead of providing the marker M on the placement table 22. Further, either one of the guide frame G and the marker M may be displayed, or both may be displayed in a predetermined order. Alternatively, both the guide frame G and the marker M may be displayed at the same time.

Based on a determination that the operator is not inside the second inspection device 2 (Yes in step S6), the image acquisition unit 54 of the information processing apparatus 50 captures an image of the T-shirt placed on the placement table 22 by the image sensor 23 in step S7. In the present embodiment, the operator not being inside the second inspection device 2 is used as a trigger for automatic capturing of the image, but the operator may start capturing the image by an operation instruction (manual, voice).

In step S8, the image verification unit 56 of the information processing apparatus 50 compares the captured image with the target image. Specifically, when the printed T-shirt image captured by the image sensor 23 is sent to the information processing apparatus 50, the image verification unit 56 of the information processing apparatus 50 compares the printed image and the target image based on the requested content stored in advance to inspect the printed T-shirt image.

An algorithm for image verification in step S8 is described in the following.

Figure 11:
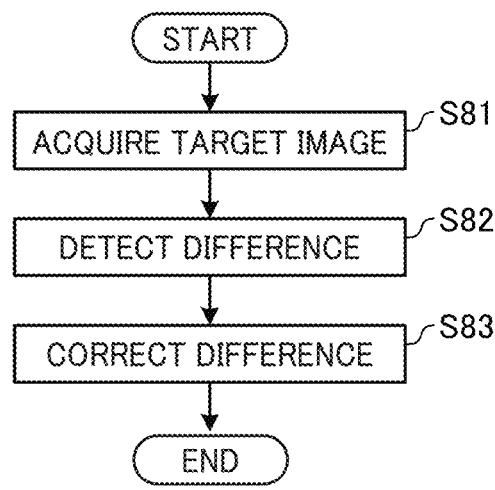
FIG. 11 is a flowchart illustrating an example of an image verification process in step S8.

FIG. 11 is a flowchart illustrating an example of an image verification process in step S8. As illustrated in FIG. 11, in step S81, the image verification unit 56 of the information processing apparatus 50 acquires the target image.

In the case the target image is stored in advance in the information storage unit 51 of the information processing apparatus 50 as the print image data, the image verification unit 56 of the information processing apparatus 50 acquires the target image stored in the information storage unit 51 and performs image verification.

In the case the target image is not stored in advance in the information storage unit 51 of the information processing apparatus 50 as the print image data, the image verification unit 56 of the information processing apparatus 50 generates and acquires the target image and the generated target image and the captured image are compared. Specifically, the image verification unit 56 of the information processing apparatus 50 performs raster image processing (RIP) of the image of the custom T-shirt obtained by synthesizing the image data of the printed image of the T-shirt requested by the customer with the specified T-shirt, and the image captured by the image sensor 23 is subjected to a prediction process to obtain the target image.

In step S82, the image verification unit 56 of the information processing apparatus 50 compares the image captured by the image sensor 23 with the target image, and detects a difference. Specifically, the image verification unit 56 of the information processing apparatus 50 detects the difference by aligning the captured image and the target image.

Note that the image verification unit 56 of the information processing apparatus 50 ignores slight shrinkage or deformation of the printed surface that is not considered as defects, and detects defect that reduce quality as the difference.

Figure 12:
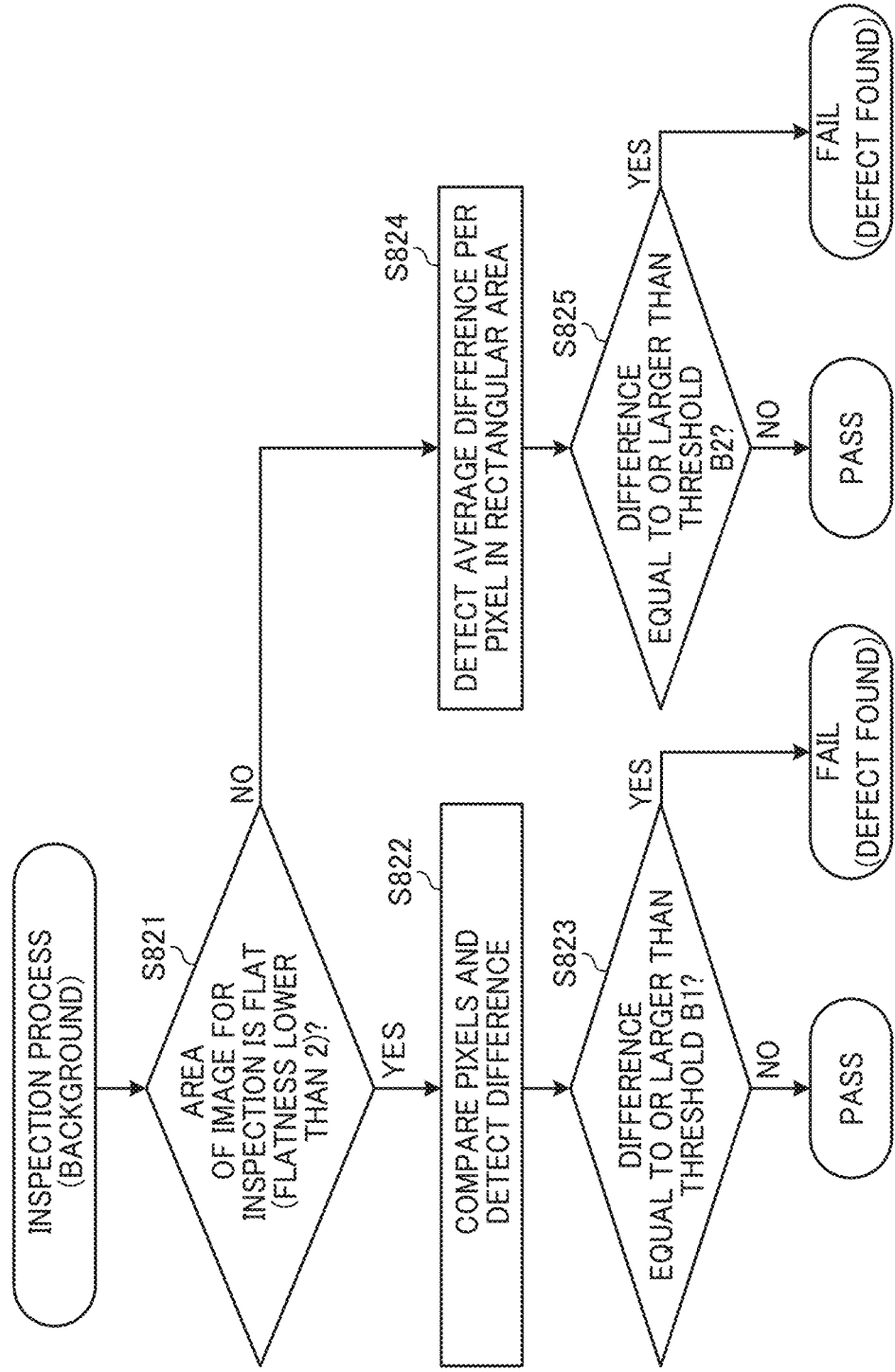
FIG. 12 is a flowchart illustrating a process of detecting difference between a captured image and a target image in step S82.

FIG. 12 is a flowchart illustrating a process of detecting difference between the captured image and the target image in step S82. As illustrated in FIG. 12, in step S821, the image verification unit 56 of the information processing apparatus 50 determines whether image area of the captured image corresponding to the background area of the target image is flat based on an analysis result of the captured image. The image verification unit 56 of the information processing apparatus 50 refers to the analysis result of the captured image among the received analysis results, and determines whether a reference value (flatness represented by a change in pixel value obtained by analyzing the captured image) is equal to or greater than a preset threshold.

In step S822, based on a determination that the reference value is less than the threshold (step S821: Yes), the image verification unit 56 of the information processing apparatus 50 assumes that there is no defect in the corresponding image area of the captured image, and compares the target image and the captured image to detect differences (differences between pixels).

In step S823, the image verification unit 56 of the information processing apparatus 50 determines whether the detected difference is equal to or greater than an inspection threshold B1. The inspection threshold B1 is a value determined as the second threshold for inspection (defect determination criterion), which is larger than the value assuming a defect when the reference value is less than the threshold.

As a result, in the case the difference is equal to or greater than the threshold B1 (step S823: Yes), the image verification unit 56 of the information processing apparatus 50 determines that there is a defect in the corresponding image area of the captured image.

On the other hand, based on a determination that the reference value is equal to or greater than the threshold (step S821: No), the image verification unit 56 of the information processing apparatus 50 assumes that a defect exists in the corresponding image region of the captured image, and detects the difference between the target image and the captured image (average difference per pixel in a rectangular area) in step S824.

In step S825, the image verification unit 56 of the information processing apparatus 50 determines whether the detected difference is equal to or greater than the inspection threshold B2. Note that the inspection threshold B2 is a value determined as the first inspection threshold (defect determination criterion) to detect a minute change in pixel value when the reference value is equal to or greater than the threshold.

As a result, when the difference is equal to or greater than the threshold B2 (step S825: Yes), the image verification unit 56 of the information processing apparatus 50 detects the defect in the corresponding image area of the captured image.

Returning to FIG. 11, in step S83, the image verification unit 56 of the information processing apparatus 50 corrects the difference between the target image and the captured image detected in step S82. Specifically, the information processing apparatus 50 classifies defects that are easily noticed or hardly noticed by humans based on human visual characteristics, and optimizes the judgment criteria, thereby improving productivity, yield rate, and inspection accuracy.

Returning to FIG. 6, the defect information notification unit 57 of the information processing apparatus 50 determines an inspection result based on the image verification in step S8, and displays the inspection result and defect information in step S9. Specifically, the defect information notification unit 57 of the information processing apparatus 50 controls the projector 24 to display the inspection result and the defect information on the placement table 22. By projecting the position, type, and size of the detected defect as defect information using the projector 24, the operator can easily recognize the position of the detected defect.

Figure 13:
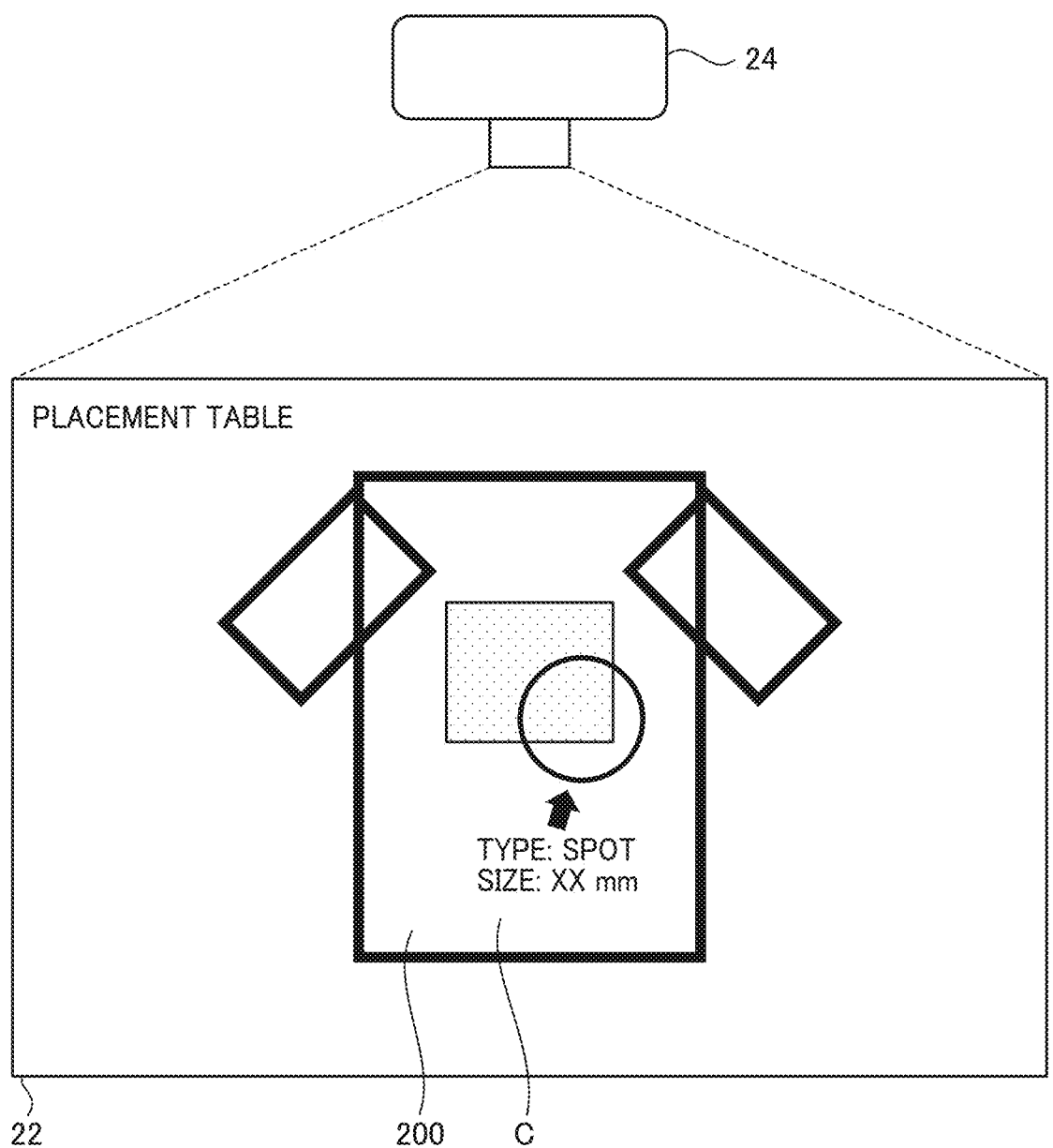
FIG. 13 is a diagram illustrating a display example of an inspection result and defect information.

FIG. 13 is a diagram illustrating a display example of the inspection result and defect information. As illustrated in FIG. 13, the defect information C projected by the projector 24 is superimposed and displayed on the actual T-shirt 200 at the position where the possible defect is detected, to facilitate the operator to recognize the position, type, and size of the defect. As a result, workload of the operator is reduced by focusing on the notified defect. In addition, since even small defects are detected as candidates, the number of defects overlooked by the operator is reduced. Furthermore, in the case a plurality of operators are performing inspection, variations in inspection due to visual observation and inspection ability, is reduced.

Moreover, for the defect detected near the threshold, the operator is able to make a judgement. In addition, for the defect difficult to be recognized by the operator, position of the defect is indicated for the operator to make the judgement.

In the present embodiment, the defect information notification unit 57 of the information processing apparatus 50 controls the projector 24 to display the inspection result and the defect information on the placement table 22, but the present disclosure is not limited to this configuration. For example, the defect information notification unit 57 of the information processing apparatus 50 may display the inspection result and the defect information on the display 506 of the information processing apparatus 50, a display unit of an external mobile terminal or PC, or the like.

In addition to displaying the inspection result and defect information, announcement by voice that a defect is detected may be made to the operator, or a warning light may be installed in the second inspection device 20 to notify that a defect is detected.

As described above, according to the present embodiment, in response to the operator placing a T-shirt (object to be inspected) on the placement table 22 of the second inspection device 20, the projector 24 provides useful information for quality inspection and error determination. In addition, whether the requested design is printed at the correct position and content is verified by comparing the target image with the image of the T-shirt (object to be inspected) automatically captured by the image sensor 23. As a result, oversight of defects that have occurred in manual quality inspection done by visual inspection of the operator can be reduced. Also, variation in quality inspection result among a plurality of operators is reduced. Furthermore, workload of the inspection for the operator is reduced, and the production efficiency is improved.

In the present embodiment, the T-shirt is used as an object to be inspected, but the present disclosure is not limited to the T-shirt, and can also be applied to clothes (shirts, casual shirts, trainers) printed on a custom order. In addition, the object to be inspected is not limited to clothing, and can be applied to non-rigid objects including cloth products such as bags, masks, and hats.

Further, in the present embodiment, the information processing apparatus 50 and the second inspection device 20 are described as separate units, but the present disclosure is not limited to this configuration, and the information processing apparatus 50 may be installed inside the second inspection device 20 as one inspection device.

FIG. 14 is a schematic diagram illustrating a modified configuration of the inspection system according to an embodiment of the present disclosure.

Note that, as illustrated in FIG. 14, the inspection system 100 includes the first inspection device 10, the second inspection device 20, the smartphone 30 and the PC 40, the information processing apparatus 50 that is a server or a PC, and the printer 60 which are communicably connected through the communication network 70.

The apparatuses or devices described in one or more embodiments are just one example of plural computing environments that implement the one or more embodiments disclosed herein. In some embodiments, the information processing apparatus 50 includes multiple computing devices, such as a server cluster. The plurality of computing devices is configured to communicate with one another through any type of communication link, including a network, shared memory, etc., and perform the processes disclosed herein. In substantially the same manner, for example, the information processing apparatus 50 includes such multiple computing devices configured to communicate with one another.

Aspects of the present disclosure are, for example, as follows.

According to a first aspect, an inspection system for inspecting an object to be inspected on which a predetermined print image is printed includes, an image acquisition unit for acquiring an image captured by an image sensor of the object to be inspected placed on a placement surface, a display control unit for displaying by a projector, print image data and attribute information of the object to be inspected on the placement surface of the object to be inspected, an image verification unit for verifying by comparing with the print image data and the captured image of the object to be inspected acquired by the image acquisition unit, and a defect information notification unit for notifying defect information for specifying a defect when the image verification unit determines that there is a defect found by the image verification.

According to a second aspect, the print image data is a target image to be obtained by printing the print image on the object to be inspected, and in the inspection system of the first aspect, the display control unit further displays the target image and the attribute information on the peripheral portion of the placement surface.

According to a third aspect, in the inspection system of the first aspect or the second aspect, the placement surface includes a marker indicating a placement position of the object to be inspected, and the image acquisition unit controls the image sensor to capture the image of the object to be inspected when the marker is not detected from the captured image for a predetermined time.

According to a fourth aspect, in the inspection system of the first aspect or the second aspect, the placement surface includes the marker indicating the placement position of the object to be inspected, and when the image acquisition unit determines that the captured image does not include a human image when the marker is not detected from the captured image for the predetermined time, the image acquisition unit controls the image sensor to capture an image of the object to be inspected.

According to a fifth aspect, in the inspection system of any one of the first aspect to the fourth aspect, the defect information notification unit notifies the inspection result and the defect information acquired from the image verification unit.

According to a sixth aspect, in the inspection system of the fifth aspect, the defect information notification unit projects the inspection result and the defect information acquired from the image verification unit to a position where a possible defect is detected on the object to be inspected placed on the placement surface.

According to a seventh aspect, in the inspection system of any one of the first aspect to the sixth aspect, the defect information notification unit notifies that the defect has occurred.

According to an eighth aspect, the inspection system of any one of the first aspect to the seventh aspect further includes an information storage unit for storing the print image data and the attribute information of the object to be inspected in association with identification information attached in advance to the object to be inspected, an identification information reading unit for reading the identification information attached to the object to be inspected, and an information acquisition unit for acquiring the corresponding print image data and the attribute information from the information storage unit based on the identification information.

According to a ninth aspect, an information processing apparatus connected to an inspection device for inspecting an object to be inspected on which a predetermined print image is printed includes, an image acquisition unit for acquiring an image captured by an image sensor of the object to be inspected placed on a placement surface, a display control unit for displaying by a projector, print image data and attribute information of the object to be inspected on the placement surface of the object to be inspected, an image verification unit for verifying by comparing the captured image of the object to be inspected acquired by the image acquiring unit with the print image data, and a defect information notification unit for notifying defect information for specifying a defect when the image verification unit determines that there is a defect found by image verification.

According to a tenth aspect, an inspection method for inspecting an object to be inspected on which a predetermined print image is printed, includes an image acquisition step of acquiring an image captured by an image sensor of the object to be inspected placed on a placement surface, a display control step of displaying by a projector, print image data and attribute information of the object to be inspected on the placement surface of the object to be inspected, an image verification step of verifying by comparing the print image data with the captured image of the object to be inspected acquired in the image acquisition step, and a defect information notification step of notifying defect information for specifying a defect based on a determination that there is a defect found by image verification in the image verification step.

According to an eleventh aspect, a program to cause a computer for controlling an information processing apparatus connected to an inspection device for inspecting an object to be inspected on which a predetermined print image is printed, to function as an image acquisition unit for acquiring an image captured by an image sensor of the object to be inspected placed on a placement surface, a display control unit for displaying by a projector, print image data and attribute information of the object to be inspected on the placement surface of the object to be inspected, an image verification unit for verifying by comparing the captured image of the object to be inspected acquired by the image acquiring unit with the print image data, and a defect information notification unit for notifying defect information for specifying a defect based on a determination by the image verification unit that there is a defect found by the image verification.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An inspection system for inspecting an object, the system comprising:
 circuitry configured to:
 acquire an image, captured by an image sensor, of the object to be inspected placed on a placement surface;
 display by a projector, print image data of the print image and attribute information of the object to be inspected, on the placement surface, the object having a printed image printed thereon;
 compare a captured image of the object to be inspected with the print image data to determine whether there is a defect; and
 based on a determination that there is a defect, output defect information for specifying the defect.

2. The inspection system of claim 1, wherein
 the print image data is a target image to be obtained by printing the print image on the object to be inspected, and
 the circuitry is configured to display on a peripheral portion of the placement surface, the target image and the attribute information.

3. The inspection system of claim 1, wherein
 the placement surface includes a marker indicating a placement position of the object to be inspected, and
 the circuitry is further configured to control the image sensor to capture the image of the object to be inspected when the marker is not detected from the captured image for a predetermined time.

4. The inspection system of claim 3, wherein
 the placement surface includes the marker indicating the placement position of the object to be inspected, and
 based on a determination that the captured image does not include a human image when the marker is not detected from the captured image for the predetermined time, the circuitry is further configured to control the image sensor to capture an image of the object to be inspected.

5. The inspection system of claim 1, wherein
 the circuitry is further configured to output an inspection result in addition to the defect information.

6. The inspection system of claim 5, wherein
 the circuitry is further configured to project the inspection result and the defect information at a position where a defect is determined to be detected on the object to be inspected placed on the placement surface.

7. The inspection system of claim 1, wherein
 the circuitry is further configured to output a notification indicating that a defect has occurred.

8. The inspection system of claim 1, wherein
 the circuitry is further configured to:
 store the print image data and the attribute information of the object to be inspected in association with identification information attached in advance to the object to be inspected;
 read the identification information attached to the object to be inspected; and
 acquire the corresponding print image data and the attribute information from one or more memories based on the identification information.

9. An inspection method for inspecting an object, the method comprising:
 acquiring an image, captured by an image sensor, of the object to be inspected placed on a placement surface, the object having a printed image printed thereon;
 by a projector, displaying print image data of the print image and attribute information of the object to be inspected, on the placement surface;
 comparing a captured image of the object to be inspected with the print image data to determine whether there is a defect; and
 based on a determination that there is a defect, outputting defect information for specifying the defect.

10. A non-transitory recording medium including instructions which, when executed by one or more processors on an information processing apparatus, cause the processors to perform a print control method, comprising:
 acquiring an image captured by an image sensor of an object to be inspected placed on a placement surface, the object having a printed image printed thereon;
 by a projector, displaying print image data of the print image and attribute information of the object to be inspected on the placement surface; and
 comparing a captured image of the object to be inspected with the print image data, and to determine whether there is a defect; and
 based on a determination that there is a defect, outputting defect information for specifying the defect.

* * * * *